Figure 1:
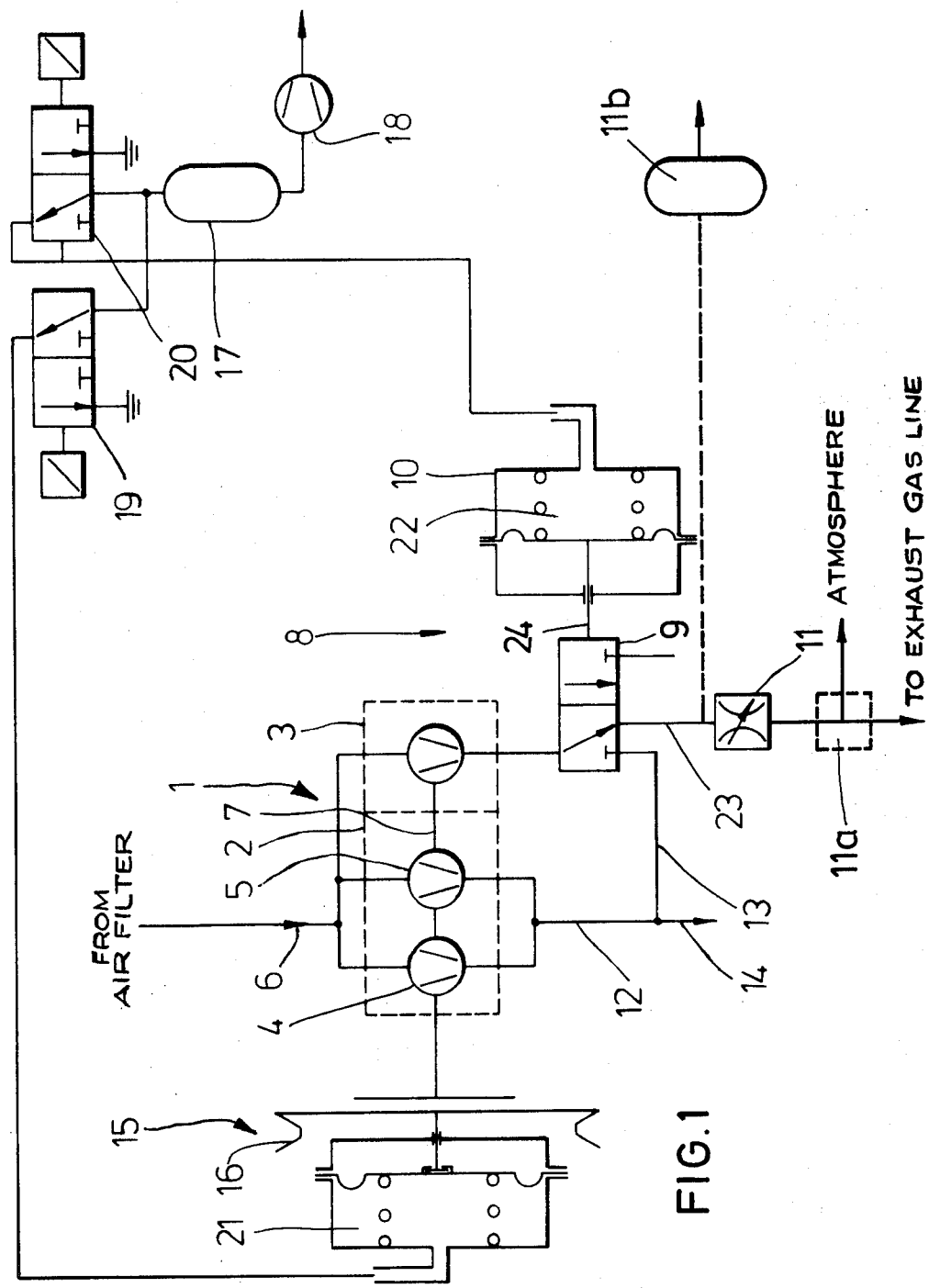

United States Patent [19]

Südbeck et al.

[11] Patent Number: 4,463,554
[45] Date of Patent: Aug. 7, 1984

[54] METHOD OF GENERATING GAS PRESSURE IN AN INTERNAL COMBUSTION ENGINE, AND APPARATUS FOR CARRYING OUT THIS METHOD

[75] Inventors: Rainer Südbeck, Duisburg; Hans Baumgartner, Viersen, both of Fed. Rep. of Germany

[73] Assignee: Pierburg GmbH & Co., KG.

[21] Appl. No.: 319,064

[22] Filed: Nov. 6, 1981

[30] Foreign Application Priority Data

Nov. 8, 1980 [DE] Fed. Rep. of Germany ....... 3042163

[51] Int. Cl.³ .................. F01N 3/22; F02B 33/36; F02B 39/12
[52] U.S. Cl. ........................ 60/274; 60/307; 60/397; 123/559; 417/237; 417/380; 417/405
[58] Field of Search ............ 60/397, 307, 274; 417/237, 380, 405; 123/559

[56] References Cited

U.S. PATENT DOCUMENTS

| | | | |
|---|---|---|---|
| 1,488,171 | 3/1924 | Savidge | 417/380 |
| 1,630,634 | 5/1927 | Porsche | 123/559 |
| 3,287,898 | 11/1966 | Morris | 60/290 |
| 3,299,629 | 1/1967 | Bouchard | 60/397 |
| 3,417,562 | 12/1968 | Morris | 60/307 |
| 3,903,695 | 9/1975 | Nakada | 60/290 |
| 3,919,843 | 11/1975 | Arnaud | 60/290 |
| 3,934,413 | 1/1976 | Beiswenger | 60/289 |

FOREIGN PATENT DOCUMENTS

| | | |
|---|---|---|
| 412830 | 7/1934 | United Kingdom . |
| 684999 | 12/1952 | United Kingdom . |
| 741840 | 12/1955 | United Kingdom . |
| 778489 | 7/1957 | United Kingdom . |
| 858697 | 1/1961 | United Kingdom . |
| 1506719 | 4/1978 | United Kingdom . |

*Primary Examiner*—Douglas Hart
*Attorney, Agent, or Firm*—Toren, McGeady and Stanger

[57] ABSTRACT

In an internal combustion engine a rotary gas motor, driven by the intake gas of the engine, drives pump providing secondary air to the engine exhaust at low engine load, and at high load a clutch connects the pump and the motor to the engine shaft, the output of the pump and the motor being delivered to the engine intake.

33 Claims, 7 Drawing Figures

METHOD OF GENERATING GAS PRESSURE IN AN INTERNAL COMBUSTION ENGINE, AND APPARATUS FOR CARRYING OUT THIS METHOD

This invention relates to a method of generating gas pressure in an internal combustion engine, and to an apparatus for carrying out this method. In internal combustion engines and devices connected directly or indirectly to them, pneumatic working systems are now being used to an increasing extent. The gas pressure required for this purpose must be generated by using a part of the work output of the internal combustion engine. Whereas, for example, in the lower load range of the internal combustion engine so-called secondary air is blown into its exhaust gas system for the purpose of modifying the exhaust gas composition, but nevertheless the gas supply to the engine is adequately assured by the suction operation, in the upper load range in order to achieve an increase in output extending beyond the amount of the output intended for the design of the internal combustion engine as a suction engine, larger quantities of gas are required for combustion than can be prepared by simple suction. This increased gas demand is satisfied by a so-called supercharger.

The blowing-in of secondary air is usually carried out by air being blown in by a motor-driven air pump in the vicinity of the exhaust gas ducts into the hot exhaust gases, in order to achieve an after-combustion of the carbon monoxide and hydrocarbons contained in the exhaust gas.

The supercharger is almost always a gas pump, which is driven through appropriate gear transmission by the internal combustion engine itself to be charged or, for example, by an exhaust gas flow (turbocharger) in such a way that a charging pressure of, for example, 1.4 bar becomes established. Since supercharging is desired only in the upper load range, the supercharger must be capable of being coupled and disengaged respectively to and from its drive apparatus.

Systems for blowing in secondary air into the exhaust gas system of an internal combustion engine and also those for supercharging are known. They require, however, each their own drive means and are made as separate devices. This results in considerable constructional cost, high weight and additional energy requirement, for example for the system for secondary air supply. This applies also for other pneumatic working systems, such as pneumatically operated valves and the like.

The task underlying the present invention therefore is to create a method for the generation of gas pressure in an internal combustion engine and also an apparatus for carrying out this method, which avoid the aforementioned disadvantages, i.e. are simple and inexpensive and especially efficient for the engine and consume as little energy as possible. In particular, it shall be possible to carry out blowing in of secondary air into the exhaust gas system of the internal combustion engine in an energy-favourable manner and also effectively to carry out supercharging.

In regard to method this task is achieved in that a gas motor continually driving a gas pump serving for the gas pressure generation is operated by the gas sucked in by the internal combustion engine. As a consequence, the otherwise usual throttle valve or a similarly acting device is dispensed with, and the hitherto uselessly throttled energy is utilized for energy saving gas pressure generation.

It is especially advantageous if, according to this invention, in the lower load range of the internal combustion engine the gas motor which drives the gas pump is operated by the gas drawn in by the internal combustion engine, and in the upper load range the gas motor in common with the gas pump is coupled to and driven by a disc driven by the internal combustion engine, and also the gas delivered by the gas pump is supplied to the gas stream conducted through the gas motor. In the lower load range, the gas motor generates therefore, by means of the gas pump, gas pressure for a consumer unit in principle of any desired type, whereas in the upper load range gas motor and gas pump together generate charging pressure, as a consequence of the driving connection which now exists from the internal combustion engine. Apart from the advantages thereby resulting for the apparatus, that namely in this manner two devices are combined into one, the energy required, for instance, for secondary gas blowing in or for another consumer is prepared by the gas motor, in that in this motor the working capacity of the pressure normally uselessly throttled down at the throttle valve in an internal combustion engine is now used for the purpose of driving the gas pump. In the upper load range, in which the combustion engine is to be supercharged, the gas motor is now no longer driven by the gas sucked in by the internal combustion engine, but from a disc driven by the internal combustion engine directly, which disc is coupled to the gas motor from this purpose. Thus the gas pump also is automatically coupled onto the disc and driven by it. The gas delivered by the gas pump is now—when the internal combustion engine is being supercharged—supplied to the gas stream which has flowed through the gas motor, so that the entire quantity of the two gas streams is available for the supercharging of the internal combustion engine.

If the internal combustion engine overcomes the lower load range by running more rapidly, then the secondary air blowing in into its exhaust gas system, for example, is usually no longer necessary, but on the other hand in this somewhat raised load range—here termed the middle load range—a further utilization of the drive energy provided by the gas motor would be desirable. This problem is solved in a further embodiment of the invention in that the gas delivered by the gas pump is supplied (a) in the lower load range as secondary air to the exhaust gas system of the internal combustion engine and (b) in a middle load range to a gas pressure vessel. The unit comprising gas motor and gas pump is therefore, as before, driven by the gas sucked in by the internal combustion engine, but the air delivered by the gas pump is now no longer used for the secondary air blowing-in into the exhaust gas system of the internal combustion engine, but is made available for building up a gas pressure to a gas pressure vessel. The necessary changing-over of the air delivered by the gas pump can, for example, be effected at a predetermined output of the gas motor, for example at 40% of the maximum output which it can achieve as a pure gas motor.

It has been found to be especially favourable if approximately 70 to 95% of the total gas quantity delivered by the gas motor and the gas pump is conducted through the gas motor—at very low frictional losses and equivalent environmental conditions, by contrast, scarely more than 50% of the said total gas quantity would need to be delivered through the gas motor. It has been found especially advantageous to subdivide the entire gas quantity into approximately 83% delivery by the gas motor and correspondingly approximately 17% delivery by the gas pump. In supercharging operation, accordingly, 100% of the delivered total gas quantity is supplied to the internal combustion engine.

The coupling operation in superchargers for internal combustion engines, which usually is carried out by a mechanically or magnetically actuated coupling (clutch), is effected according to a further embodiment of this invention by a pneumatically actuated coupling. Such couplings have the advantage of relatively small constructional volume, relatively low weight and also comparatively low manufacturing costs. An outstanding advantage consists in the fact that a re-adjustment of the coupling normally required at intervals (due to wear of the lining) can be dispensed with, since pneumatic couplings automatically adapt to the wear of the lining by an increase in stroke. A simple and especially light form of the unit coupling-gas motor-gas pump is advantageous both for the efficiency of the gas motor as drive for the gas pump and also for the efficiency of the entire unit as a supercharger.

The changing-over from operation in the lower load range to the supercharging operation, that is in the upper load range, is with advantage carried out in that the air delivered by the gas pump is supplied by means of a preferably pneumatically actuated valve optionally either to the gas pressure consumer, such as for example the exhaust gas system, or to the gas stream conducted through the gas motor. Such pneumatically actuated valves have a relatively low weight and a favourable response behaviour. Furthermore, as will be demonstrated below, the energy required for the shifting operation can be obtained especially favourably from other existing devices.

Both the pneumatically actuated coupling and also the pneumatically actuated valve can be actuated, with appropriate design, by means of above-atmospheric and/or subatmospheric pressure. One especially energy-favourable actuation of the pneumatically actuated coupling and/or of the pneumatically actuated valve is carried out by these devices being loaded by the pressure produced by the gas pressure generation, preferably by the peak pressure; for this purpose, in particular, the peak pressure generated by the supercharging is appropriate.

Independently of the gas pressure source by which the pneumatically actuated valve and/or the pneumatically actuated coupling is or are loaded, the control of the working pressures by means of gate valves is to be recommended; these valves may be operated either mechanically or electromagnetically.

By the omission of the throttle valve at the internal combustion engine and its replacement by a gas motor, another device for influencing the motor output is rendered necessary. It is especially favourable if the gas quantity conducted through the gas motor is regulated by means of a pressure-reducing valve connected before or behind the gas pump.

The more strongly the pressure of the air stream conducted through the gas pump is throttled, the greater is the output drop at the gas pump and consequently the quantity of air that can be sucked in by the internal combustion engine through the gas motor. If the pressure-reducing valve is connected before the gas pump, then only this pump and not the gas motor as well needs to be directly affected by it, since otherwise the throttled-down pressure would be lacking from the gas motor as drive force.

One especially simple solution is provided if the pressure-reducing valve is connected behind the gas pump and by its help a more or less high counter pressure is built up behind the gas pump. In this manner both the gas flows (that of the gas motor and that of the gas pump) are simultaneously regulated.

The coupling and decoupling of gas motor and disc can be initiated or effected basically by a wide variety of signals. In the case of the present invention it is especially recommended that this operation be carried out with the help of the gas lever which regulates the output of the internal combustion engine, in that each of these operations is carried out at a specific position of the gas lever. This can be effected, for example, with a known kick-down circuit.

According to a further embodiment of the invention, the decoupling of the gas motor from the disc is assisted by at least one spring. As a result exact decoupling is achieved and undesired grinding of this coupling is avoided.

At the best, such a spring acts in opposition to the gas pressure which actuates the pneumatic coupling. The force effect caused by the pneumatic pressure must therefore exceed the counter-force of the spring in order that coupling up can be effected. On the other hand, such a spring supports the decoupling to the extent that this does not have to be effected alone by the pneumatic device and the latter therefore can be constructed especially lightly and simply. It may indeed be sufficient only to cause that pneumatic pressure which was applied for coupling to escape in order to decouple.

Furthermore it is possible, by means of a further spring which acts inside the pneumatic device, to facilitate the coupling or decoupling or the holding in the end positions of the coupling. Especially suitable for this purpose is the use of a cup spring, which may also be designed as a spring washer.

The task of the present invention is solved in regard to apparatus for the carrying out of the method by a gas motor driven by the gas sucked in by the internal combustion engine, which motor is drivingly coupled to a gas pump serving for generating the gas pressure. As a result it becomes possible to render hitherto uselessly throttled gas pressure useful for the purpose of pressure generation and storage and to save energy-consuming devices that otherwise would be necessary for this purpose.

It has proved especially advantageous if, according to this invention, the gas motor can be coupled to a disc driven by the internal combustion engine, and the gas pump possesses a gas outlet pipe to be connected with a gas inlet pipe of the internal combustion engine.

Preferably, the gas motor actuating the gas pump has a throughput capacity of approximately 70 to 95% of the total throughput capacity of gas motor and gas pump.

A gas motor which has a common rotational axis with the gas pump is especially space-saving, free of frictional losses and simple in construction. In this manner the drive forces acting upon the gas motor are transmitted directly to the gas pump.

According to one especially favourable further embodiment of the invention, the gas motor and the gas pump are constructed as a vane type pump comprising two pump chambers disposed one behind the other on a common rotational axis. Thus the gas motor and gas pump are integrated in one single housing.

It is to be recommended to connect a pneumatically actuated coupling before the gas motor, since this coupling, as already explained earlier, is especially weight-saving and inexpensive in the present application, and frictional and inertia losses are kept within especially narrow limits.

A preferably pneumatically actuated valve, connected behind the gas pump, assures according to a further embodiment of this invention that the gas delivered by the gas pump is supplied optionally to the gas pressure consumer, such as for example the system for secondary air blowing-in (in the exhaust gas system of the internal combustion engine) or to the gas stream conducted through the gas motor. Such a valve is most favourably constructed as a two-way valve, whereby the energy necessary for actuating the valve is obtained from a gas pressure vessel which in any case is present in the internal combustion engine. In this manner large electromagnetic valves, which necessarily consume relatively high electrical current, can be dispensed with.

In the gas path leading to the gas pump or from it, a pressure-reducing valve is disposed according to a further embodiment of the invention. Such a pressure-reducing valve replaces the usual throttle valve otherwise provided in internal combustion engines, in that by widening or constricting the flow cross-section a variably high pressure drop is generated, which determines the output capacity of the gas pump and thus also of the gas motor and thus its gas throughput. If the pressure-reducing valve is connected before the gas pump then, as already mentioned, only the gas pump alone (and not the gas motor also) should of course be affected by it.

The gas pressure produced by the gas pump is advantageously supplied to a gas pressure vessel, which is connected after the gas pump and before the pressure-reducing valve. In this solution, therefore, the pressure-reducing valve must also be connected behind the gas pump. By means of the gas pressure vessel according to this invention, a supply in principle to any pneumatic systems is possible, provided the gas pressure is sufficient.

A two-way valve connected according to this invention in front of both the gas pump and also the pressure-reducing valve makes possible optional switching-over of the gas stream delivered by the gas pump between a connecting line to atmosphere and to the exhaust gas system of the internal combustion engine.

The pneumatically actuated coupling and the pneumatically actuated valve are best controlled by gate valves connected before them. Such valves can be of relatively small construction and require relatively little energy for their operation, since they regulate solely the gas supply to the two aforementioned pneumatic devices which do the actual work. In both cases, therefore, there is here a servo system.

The actual servo energy is best provided by a gas pressure vessel being connected before the pneumatically actuated coupling and/or the preferably pneumatically actuated valve. Such a gas pressure vessel can be kept at the necessary working pressure continually by means of an above-atmospheric or sub-atmospheric source.

A gas connecting line between the gas pressure vessel and the gas inlet pipe of the internal combustion engine has proved especially favourable, since in this manner the gas pressure vessel is loaded with the supercharging pressure present during supercharging of the internal combustion engine. In this case, the above-atmospheric pressure vessel loaded with the gas pressure generated by the gas pump may also be used.

According to a further embodiment of the invention it is also possible to provide a further gas pressure vessel, which is loaded with the opposite pressure to the first gas pressure vessel and is connected in front of the pneumatically actuated coupling and/or the pneumatically actuated valve. In this manner an especially reliable functioning of the coupling can be achieved, and the spring which supports decoupling needs to apply only relatively low forces and can therefore be of very light construction.

One especially compact and light construction of a supercharger according to the present invention is obtained by the pneumatically actuated coupling and the preferably pneumatically actuated valve being integrated together with the gas motor and the gas pump to one supercharging unit.

The apparatus according to the present invention is advantageously equipped with a driving disc, journalled coaxially with the disc which, for instance, may be a flywheel disc, and axially displaceable, in driving connection with a rotor of the gas motor and having a thrust bearing and a thrust bearing cover, and also with a movable cover, in active connection with the thrust bearing cover, of a space loaded by pneumatic pressure and having a base region and also with at least one spring in active connection with the driving disc. Such a combination is especially light and functionally reliable and avoids wear of the coupling when the supercharger unit consisting of gas motor and gas pump is decoupled from the flywheel disc.

The axial displacement capability of the driving disc in relation to the rotor is advantageously assured by pins being able to engage into bores of the rotor in the axial direction, which pins are fixed to the driving disc and assure the necessary clearance in the axial direction; vice versa, however, the driving disc may be equipped with the aforementioned bores and the rotor with the aforementioned pins.

One very simple and easily manufactured active connection between the thrust bearing cover and the movable cover of the space loaded by pneumatic pressure is assured by an appropriate mounting being disposed both on the thrust bearing cover and also on the cover of the space loaded with pressure and by a lever for force transmission between these two being provided between these two mountings.

According to a further embodiment of the invention, however, the cover of the space loaded with pressure may also be firmly connected to the thrust bearing cover.

A very low overall height of the pneumatically actuated coupling is achieved if the pressure connection pipe for the pneumatic actuation is situated in a depression on the cover of the space loaded with pressure.

As a connection between the cover and the base region of the space loaded with pressure, a flat membrane is especially suitable, since such a membrane is especially appropriate for resisting alternating pressure loadings and it can also further reduce the overall size of the space. Other membranes, for example roll membranes, are of course also suitable for the purpose of this invention.

The functioning of the pneumatically actuated coupling is especially favourably influenced if the spring acts upon the drive disc in opposition to the pneumatic pressure.

An additional cup spring, acting between the cover of the space loaded with pressure and its base region, enables a reliable coupling or decoupling to be achieved even with relatively low pneumatic pressure.

This is especially the case when such a cup spring is constructed as a spring washer, which ensures a reliable holding in the two limiting positions of the coupling.

Figure 2:
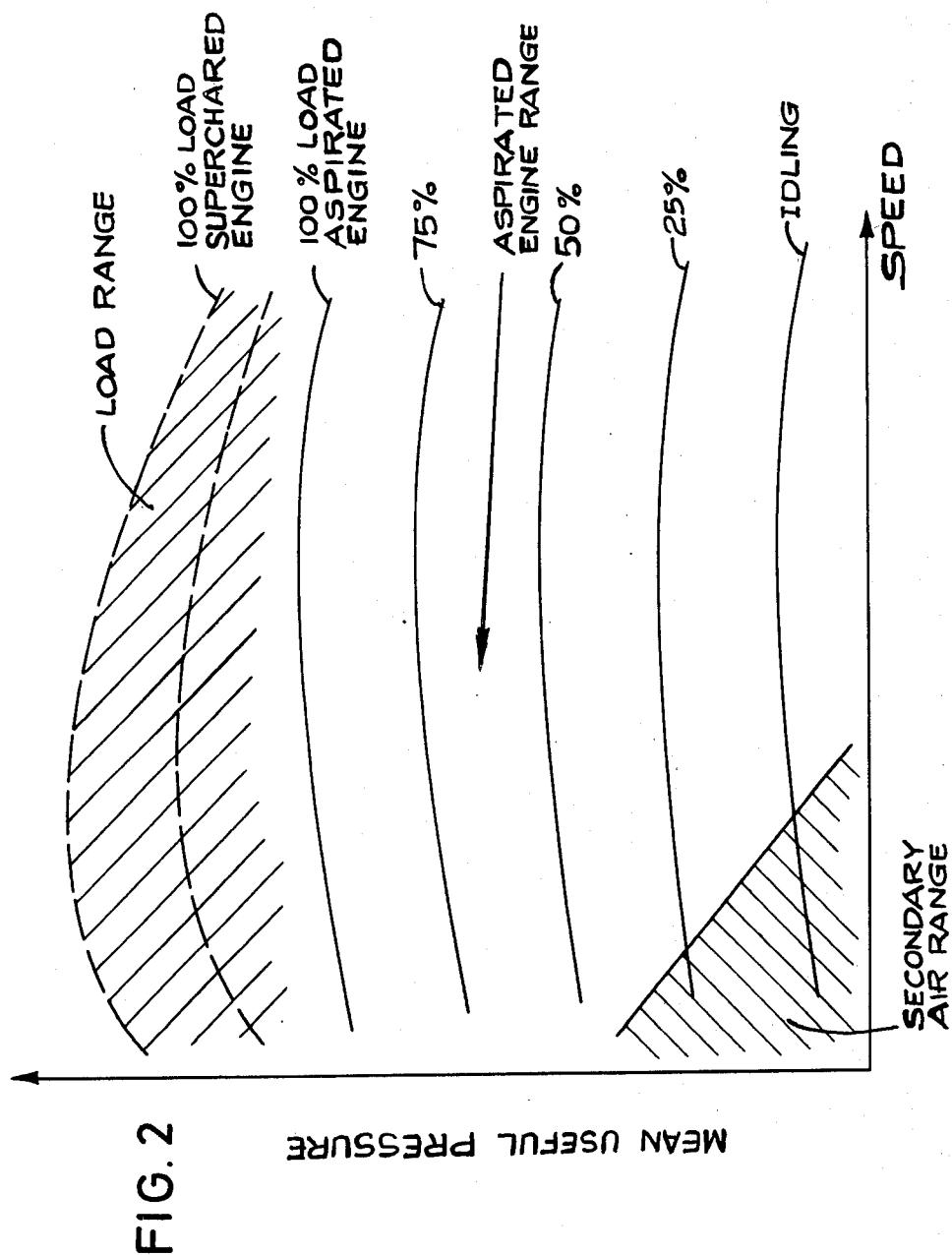
Figure 3:
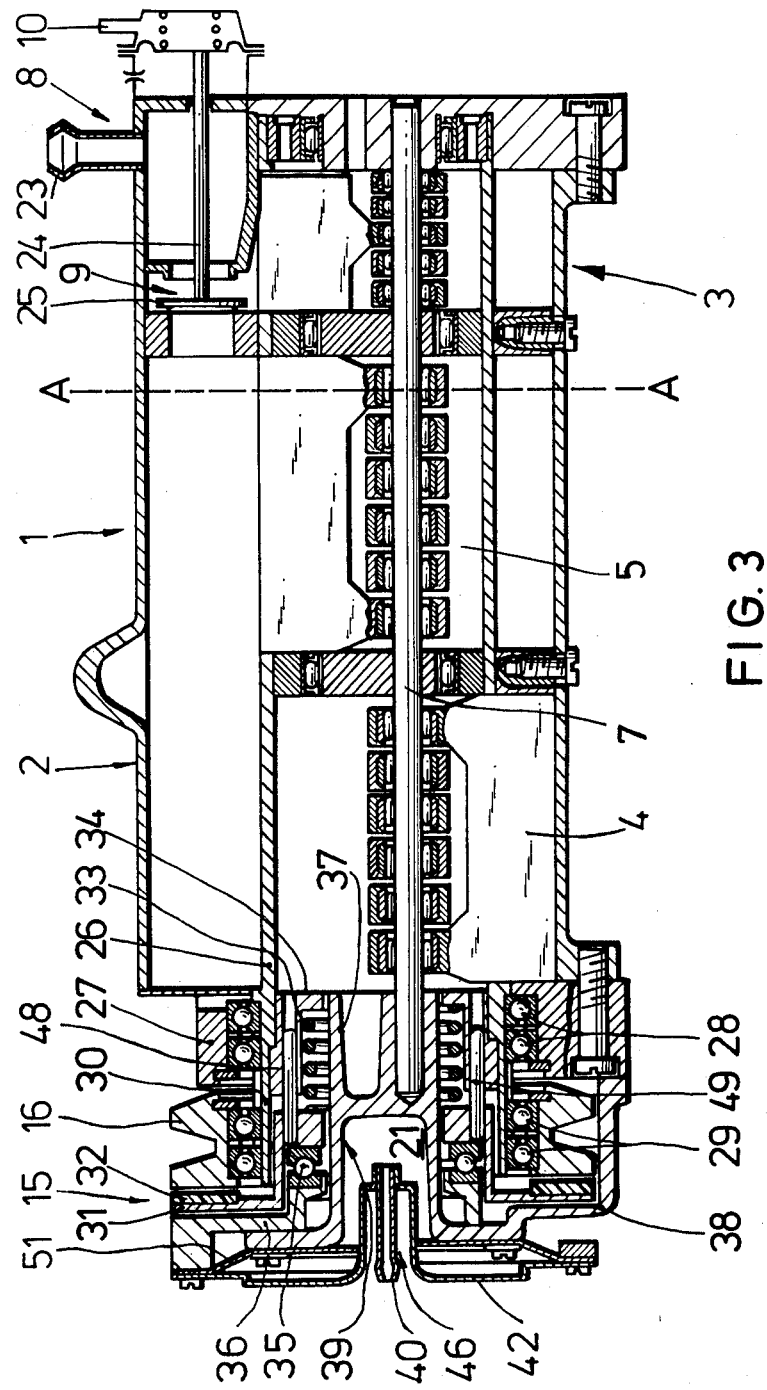
Figure 4:
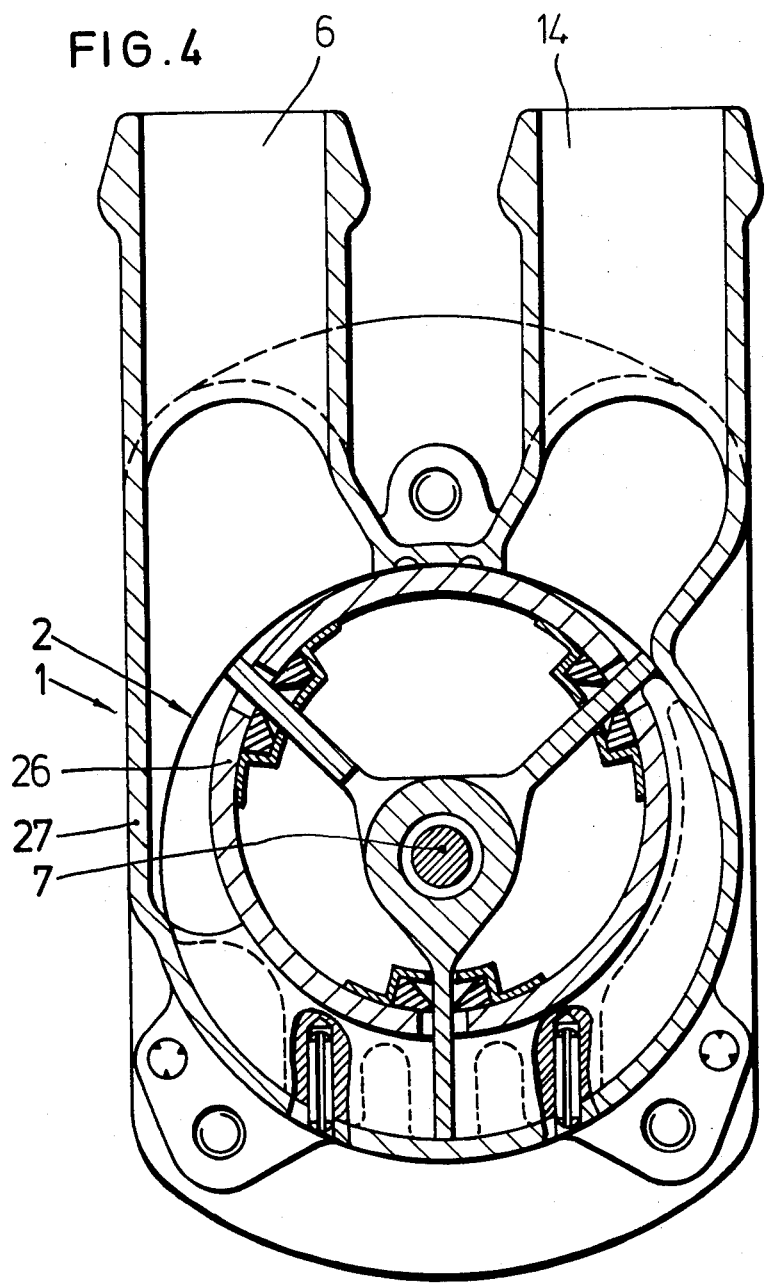
Figure 5:
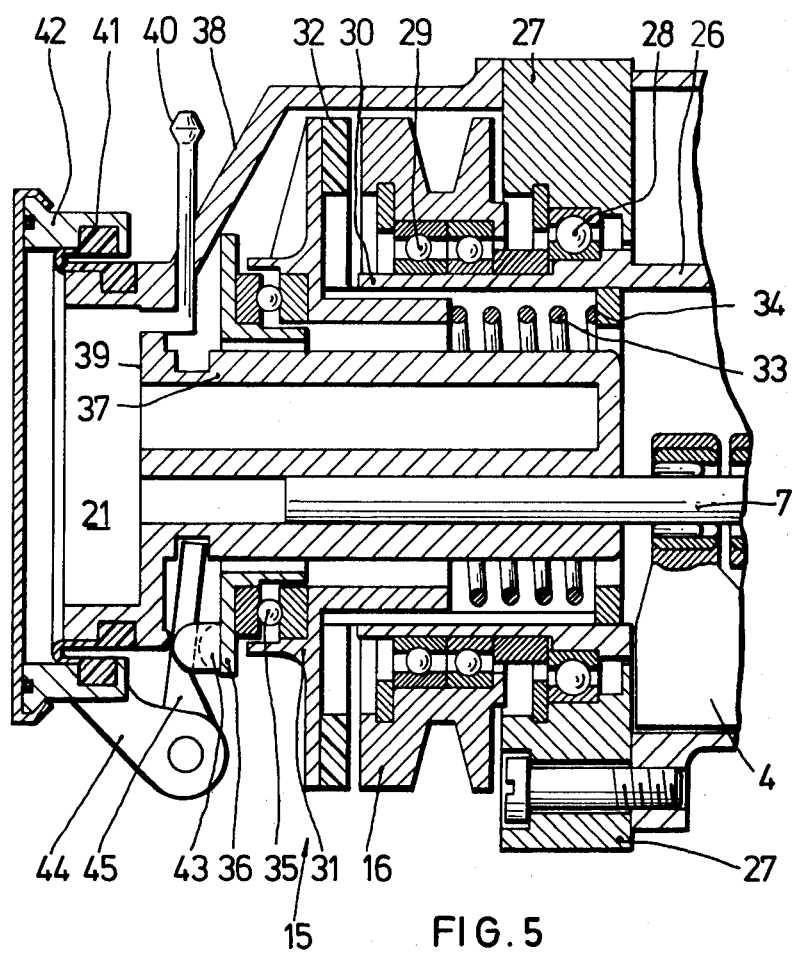
Figure 6:
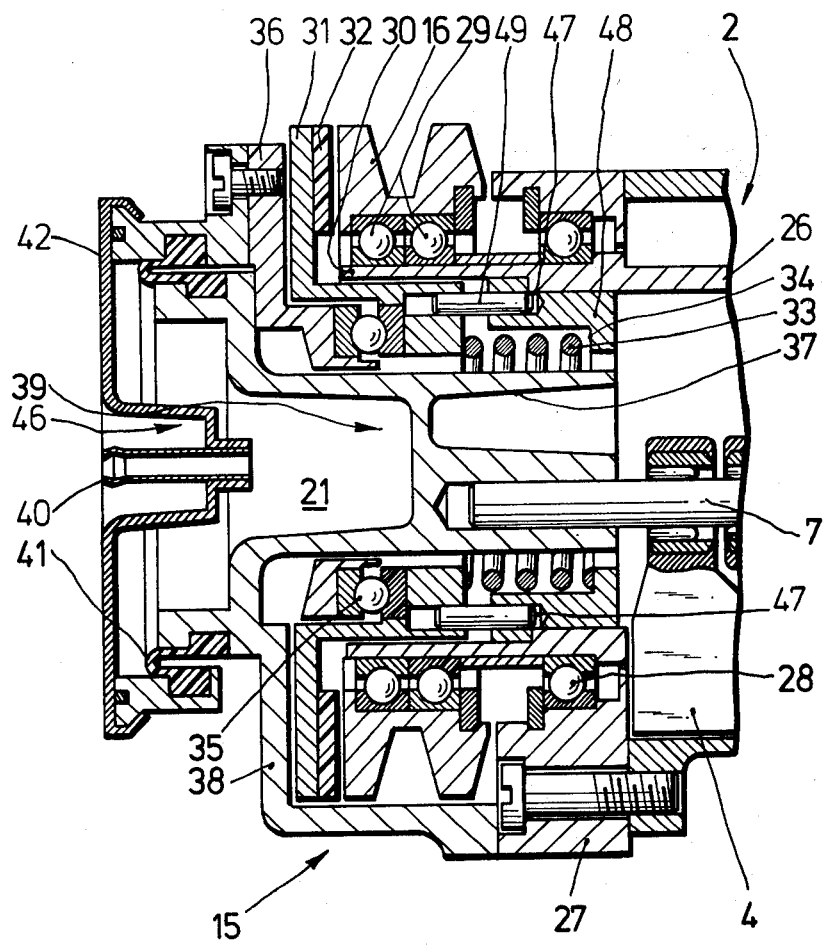
Figure 7:
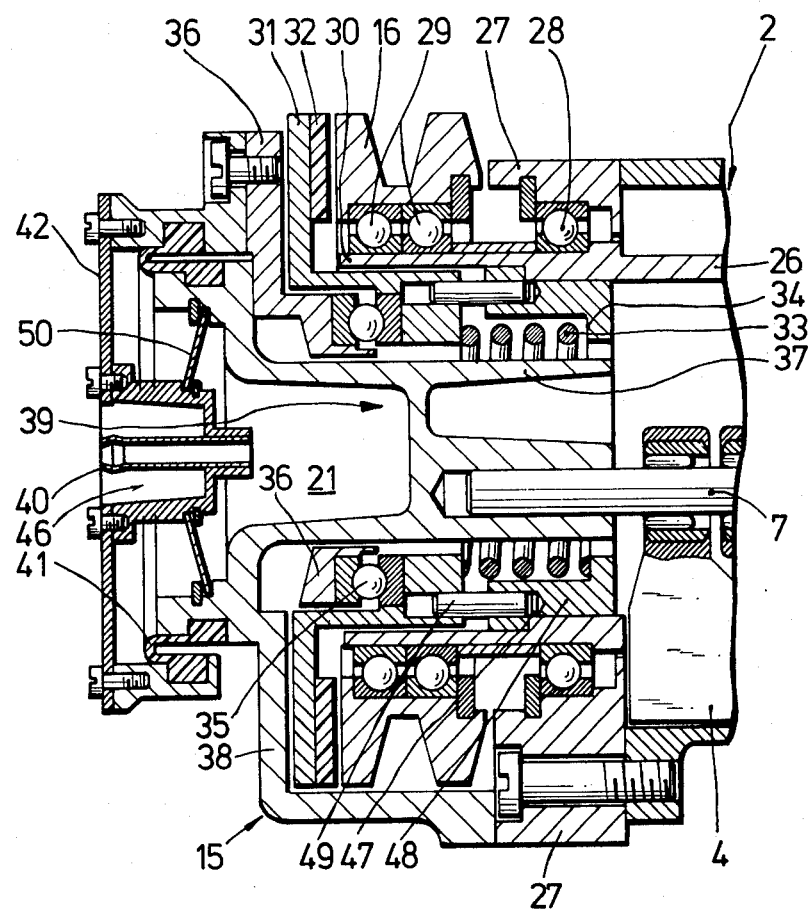

The invention is explained in more detail with reference to the examples of embodiment thereof illustrated in the drawings. The drawings show:

FIG. 1 a principles sketch of the apparatus of this invention;

FIG. 2 an output diagram of an internal combustion engine with secondary air blowing-in and supercharging;

FIG. 3 a longitudinal section through a supercharger of this invention comprising integrated, pneumatically actuated coupling and integrated, pneumatically actuated valve;

FIG. 4 a section along A—A in FIG. 3;

FIG. 5 a longitudinal section through the coupling portion according to FIG. 1, but in another form of embodiment;

FIG. 6 representation according to FIG. 5, but in another form of embodiment; and FIG. 7 representation according to FIG. 5, but in a further form of embodiment.

In FIG. 1, a supercharger unit 1 is illustrated, which consists of a gas motor 2 and gas pump 3. The gas motor 2 consists, in this case, of two approximately equal-sized, co-operating pump chambers (motor units) 4 and 5. The two motor units 4 and 5 and also the gas pump 3 receive, via a feed line 6, air at approximately atmospheric pressure from an air filter, not shown. It is, of course, also possible to supply a combustion gas mixture to the motor units 4 and 5 and to supply air or another gas only to the gas pump 3. Through the sub-atmospheric pressure present at the (not illustrated) gas inlet pipe to the internal combustion engine, gas, especially air, is sucked through the motor units 4 and 5, so that these units drive a common rotational shaft 7. Through the rotational shaft 7 the gas pump 3 is driven from the gas motor 2, either coupled directly or via a gear, in a manner not illustrated here.

In the lower load range of the internal combustion engine, where supercharging therefore is not necessary, but for example secondary air blowing-in into the exhaust gas system is desired, the air delivered by the gas pump 3 can be supplied to the exhaust gas line, not illustrated, of the internal combustion engine. This is done through the intermediary of a preferably pneumatically actuated valve 8, which usually consists of a conventionally known two-way valve 9 and a pneumatic actuating element 10. In the gas path, leading to the exhaust gas line, of the two-way valve 9 a pressure-reducing valve 11 is incorporated. This valve can be adjusted, for example by the gas lever which regulates the output of the internal combustion engine, in such a manner that a greater or lesser pressure drop takes place in it. The greater the pressure drop is, the more strongly will the gas pump 3 and thus also the gas motor 2 be braked. Thus the pressure-reducing valve 11 can replace the function of the throttle valve otherwise usual on internal combustion engines. In principle, the pressure-reducing valve 11 may also be installed in the gas line which leads directly to the gas pump 3, but it should not be connected upstream of the motor units 4 and 5 as well.

A two-way valve 11a may be connected behind the pressure-reducing valve 11, the gas outlet sides of which (two-way valve) which can be alternately loaded with gas, may be connected with the exhaust gas line of the internal combustion engine or with atmosphere respectively. If no secondary air blowing-in is desired, the two-way valve 11a is switched over to "atmosphere".

Independently thereof, a gas pressure vessel 11b may be connected in front of the pressure-reducing valve 11, which vessel consequently is loaded with the pressure upstream of the pressure-reducing valve 11 and consequently stores the previously uselessly throttled gas pressure.

In order that the supercharger unit 1, consisting of gas motor 2 and gas pump 3, can operate as such, the gas pump 3 should possess a gas outlet pipe 13 that can be connected with the gas inlet pipe 14 of the internal combustion engine. In addition, a coupling 15 is required, which couples the supercharger unit 1 to a disc 16, driven by the internal combustion engine.

The disc 16 revolves continually at a rotational speed determined by the engine speed, which speed is so designed that, in the case of coupling of the supercharger unit 1, the desired supercharging pressure of, for instance, approximately 1.4 bar is assured.

The coupling 15 is, according to a further advantageous embodiment of the invention, illustrated according to FIG. 1 as a pneumatically actuated coupling and is explained in more detail below. Both the pneumatically actuated coupling 15 and also the preferably pneumatically actuated valve 8 obtain their working pressure from a gas pressure vessel 17 which, according to FIG. 1, can be maintained for instance by a vacuum pump 18 at a constant pressure level. Via gate valves 19, 20, which can be separately actuated—for example mechanically or electromagnetically—spaces 21 and 22 of the pneumatically actuated coupling 15 and the pneumatically actuated valve 8 respectively are loaded with working pressure. The pneumatically actuated valve 8 and the pneumatically actuated coupling 15 can, of course, also operate with an appropriately modified form at sub-atmospheric pressure. In this case it is especially advantageous if the pressure vessel 17 possesses a connecting line, not illustrated in FIG. 1, leading to the gas inlet pipe 14. In this manner the pressure vessel—if necessary through the intermediary of appropriate valves—can be loaded for instance on each occasion with the peak pressure at supercharging of the internal combustion engine to such an extent that the gas quantity is sufficient for the next actuating operations of the pneumatically actuated valve 8 and of the pneumatically actuated coupling 15. Finally, it is also possible to actuate both the pneumatically actuated valve 8 and also the pneumatically actuated coupling 15 in separate lines and through separate gas pressure vessels in the one direction with above-atmospheric pressure and to cause the opposite working function with sub-atmospheric pressure.

FIG. 2 illustrates in what load ranges of the engine, for example, supercharging operation and secondary air blowing-in into the exhaust gas system of the internal combustion engine respectively may be desired. In the non-hatched intermediate regions it is, for example, possible to supply the gas delivered from the gas pump 3 to the gas pressure vessel 11b.

In FIG. 3 the pump chambers (motor units) 4 and 5 of the gas motor 2 and the gas pump 3 are mounted on a single shaft 7 and constructed as a vane type pump—as can be seen from FIG. 4. The gas feed line 6 for gas motor 2 and gas pump 3 can be seen only in FIG. 4, likewise also the collecting line 14. The pneumatically actuated valve 8 is integrated into the supercharger unit. The pneumatic actuating element 10 actuates, via a valve rod 24, a valve plate 25 which can produce alternately either a connection of the gas pump 3 with a gas pressure pipe 23 or with the gas inlet pipe 14, not shown here, while it closes the correspondingly other gas connection. The motor units 4 and 5 of the gas motor 2 can, as a consequence of their effective overall length, supply approximately 83% of the total gas quantity which the gas motor and the gas pump together can deliver. In the view according to FIG. 3, the supercharger unit operates in the lower load range of the internal combustion engine, i.e. the gas motor is driven by the vacuum generated by the internal combustion engine, for example by the intake air, and the gas pump 3 supplies secondary air via the gas delivery pipe 23, for example to the exhaust gas line of the internal combustion engine. The pneumatically actuated coupling 15 is therefore situated in a decoupled state from the disc 16.

The pneumatically actuated coupling 15 will be explained, on account of the more favourable scale, in connection with FIGS. 5 to 7.

In FIG. 4, amongst other things, a rotor 26 of a conventionally known vane type pump is illustrated.

In FIG. 5, the rotor 26 of the gas motor 2 and of the gas pump 3 is journalled in low-friction manner relative to a housing 27 by a ball bearing 28. The disc 16—in the present case a V-belt disc—which is connected via a not-illustrated drive to the internal combustion engine, is journalled by a ball bearing 29 on an extension 30 of the rotor 26 in a rotationally free and low-friction manner.

A driving disc 31 is disposed coaxially to the disc 16 and axially displaceable relative to the extension 30 of the rotor 26 in such a manner that it can come with its lining 32 into active connection with the disc 16 or be disengaged therefrom. Coaxially to the rotor 26 a spring 33 is supported on the one hand against a shoulder 34 of the rotor 26 and on the other hand against the driving disc 31 in such a manner that this spring, if an appropriate counter-force is lacking, hold the driving disc 31 away from the disc 16. On the opposite side in the axial direction, on which the spring 33 acts upon the drive disc 31, this disc possesses a thrust bearing 35 having a thrust bearing cover 36. The thrust bearing cover 36 is axially displaceable, in a coaxial region 37 of the housing 27, in the axial direction together with the thrust bearing 35 and the drive disc 31.

The housing 27 possesses an end region 38, which covers the upper part of the disc 16 and leaves exposed the lower part of the disc 16 for engagement of a V-belt. This end region 38 carries the housing region 37 and constitutes, at its left end, a base region 39 of a space 21, which is connected via a pressure connection pipe 40 with a gas pressure vessel 17, not illustrated here. The space 21 is formed on the one hand by the base region 39 and on the other hand by a cover 42 sealingly connected by a roll membrane 41 with the base region 39.

The thrust bearing cover 36 and the cover 42 of the space 21 each possess a mounting 43, 44 respectively, which are in active connection with each other by a lever 45 in such a manner that, when a relative movement occurs of the thrust bearing lid 36 and the housing region 37, the cover 42 is moved in the same direction as the thrust bearing cover 36. Conversely, the thrust bearing cover 36 is moved via the lever 45 by an axial movement of the cover 42 in the same sense. Vacuum of adequate magnitude at the pressure connection pipe 40 would move the cover 42 towards the base region 39 and displace the thrust bearing cover 36 via the mountings 43 and 44 and the lever 45 towards the right, by overcoming the spring force of the spring 33. As a result the lining 32 of the drive disc 31 can come into active engagement with the disc 16. Since the drive disc 31 and the rotor 26 are connected, for example, by a set of wedge-shaped teeth firmly to one another in the rotational sense, the rotor 26 is now no longer freely sucked through by the internal combustion engine, but is driven by the disc 16 at that rotational speed at which the disc 16 in its turn is driven by the internal combustion engine. This rotational speed is higher than the rotational speed during free sucking through of the gas motor by an amount which renders possible the desired supercharging pressure of, for example, 1.4 bar.

When the gas motor 2 is decoupled from the disc 16 the vacuum in the space 21 is reduced, so that the spring 33 is capable of pulling the drive disc 31 away from the disc 16 again. This process can also be supported by the space 21 being brought to a certain above-atmospheric pressure by appropriate gas pipes and valves, not illustrated.

The example of embodiment according to FIG. 6 differs from that of FIG. 5 to the extent that some further improvements have been carried out here, which favourably influence the overall weight, overall size and manufacture. The pressure connection pipe 40 is now housed in a depression 46 of the cover 42. Between the thrust bearing cover 36 and cover 42 a screw connection has been created, so that the mountings 43 and 44 and the lever 45 have been omitted. The active connection between drive disc 31 and rotor 26 has been produced by axially aligned bores 47 being formed in a sleeve 48 pressed into the rotor 26, into which bores pins 49 of the drive disc 31 are axially displaceable. These pins ensure force connection in the rotational direction. They can, however, also be mounted correspondingly on the rotor 26 and engage into corresponding bores of the drive disc 31.

According to FIG. 7, the embodiment according to FIGS. 5 and 6 has been modified in that a cup spring 50, which also may be constructed as a spring washer, is disposed between the base region 39 and the cover 42 in such a manner that it promotes the decoupling and the coupling operations. Provided the cup spring is formed as a spring washer, it can also serve for reliably holding the coupling in the two extreme positions. A further variant corresponding to FIG. 6 of the coupling can be seen from FIG. 3, according to which the rolling membrane 41 has been replaced by a flat membrane 51. Such flat membranes are still more suitable than rolling membranes for resisting the repeated pressure alternating loadings such as occur in the present case.

With the help of the device of the present invention, therefore, not only is a simple apparatus for gas pressure generation created, but also in a special form of embodiment a supercharger for internal combustion engines, which is of especially compact and light construction and can combine in itself several functions, in particular renders possible a secondary air blowing-in into the exhaust gas system of the internal combustion engine, without requiring for this purpose special auxiliary energy. The entire supercharger unit requires, from external energy sources, no more than the low current or the slight mechanical actuation of the gate valves 19 and 20 and also the pressure-reducing valve 11. It operates, furthermore, largely loss-free and consequently has a high efficiency.

Key to figures

FIG. 1 vom Luftfilter=from air filter
Atmosphäre=Atmosphere
zum Abgasstrang=to exhaust gas line

FIG. 2

Ladebereich=charging range
100% Last aufgel Motor=100% loading supercharged engine
100% Last Saugmotor=100% loading sucking engine
Saugmotorbereich=Sucking engine range
Sekundärluftbereich=Secondary air range
Leerlauf=Idling
Drehzahl=Rotational speed
mittlerer Nutzdruck=mean useful pressure

We claim:

1. In a method of generating gas pressure in an internal combustion engine wherein a gas motor (2) continually driving a gas pump (3) serving for the generation of gas pressure is driven by the gas drawn in by the internal combustion engine, the improvement comprising the steps of:
   driving the gas motor (2) which drives the gas pump (3) by the gas drawn in by the internal combustion engine in the lower load range of the internal combustion engine;
   coupling the gas motor (2) in common with the gas pump (3) to a disc (16) driven by the internal combustion engine and driving said gas motor by said disc in the upper load range of said internal combustion engine; and
   supplying the gas delivered to the gas pump (3) to the gas stream conducted through the gas motor (2).

2. Apparatus for generating gas pressure in an internal combustion engine comprising a gas motor (2) driven by the gas sucked in by the internal combustion engine, and a gas pump with which said gas motor is drivingly connected, said gas pump (3) serving for generating the gas pressure, wherein the gas motor (2) can be coupled to a disc (16) driven by the internal combustion engine and the gas pump (3) possesses a gas outlet pipe (13) to be connected to a gas inlet pipe (14) of the internal combustion engine.

3. Method according to claim 1, wherein the gas delivered by the gas pump (3)
   (a) is supplied in the lower load range as seconday air to the exhaust gas system of the internal combustion engine and
   (b) is supplied in a middle load range to a gas pressure vessel (11b).

4. Method according to claim 1 or 3 wherein approximately 70 to 95% of the total gas quantity delivered by the gas motor and the gas pump (3) is conducted through the gas motor (2).

5. Method according to claim 1 wherein the gas motor (2) is coupled to the disc (16) by means of a pneumatically actuated coupling (15).

6. Method according to claim 5 wherein the air delivered by the gas pump (3) is supplied by means of a preferably pneumatically actuated valve (8) optionally to the gas pressure consumer or to the gas stream conducted through the gas motor (2).

7. Method according to claim 6 wherein one of the pneumatically actuated coupling (15) and the pneumatically actuated valve (8) are loaded by the pressure prepared by the gas pressure generation, preferably the peak pressure.

8. Method according to claim 7 wherein the pneumatically actuated valve (8) and the pneumatically actuated coupling (15) are controlled by means of gate valves (19, 20).

9. Method according to claim 1 wherein the gas quantity conducted through the gas motor (2) is regulated by means of a pressure-reducing valve (11) connected in front of or behind the gas motor (2) only.

10. Method according to claim 5 wherein the coupling and decoupling between the gas motor (2) and the disc (16) takes place at a specific position of a gas lever which regulates the output of the internal combustion engine.

11. Method according to claim 10 wherein the disengagement of the gas motor (2) from the disc (16) is supported by at least one spring (33).

12. Method according to claim 11 wherein the spring (33) acts in opposition to the gas pressure actuating the pneumatic coupling (15).

13. Apparatus according to claim 2 wherein the gas motor (2) and the gas pump (3) possess a common rotary shaft (7).

14. Apparatus according to claim 2 wherein the gas motor (2) and the gas pump (3) are constructed as a vane-type pump comprising two pump chambers (4, 5) disposed one behind the other on a rotary shaft (7).

15. Apparatus according to claim 2 further comprising a pneumatically actuated coupling (15) connected in front of the gas motor (2).

16. Apparatus according to claim 15 comprising a preferably pneumatically actuated valve (8) connected behind the gas pump (3).

17. Apparatus according to claim 2 further comprising a pressure-reducing valve (11) connected with said gas pump (3).

18. Apparatus according to claim 17 further comprising a gas pressure vessel (11b) connected behind the gas pump (3) and before the pressure-reducing valve (11).

19. Apparatus according to claim 18 further comprising a two-way valve (11a) connected behind the gas pump (3) and the pressure-reducing valve (11).

20. Apparatus according to claim 13 further comprising gate valves (19, 20) connected in front of the pneumatically actuated coupling (15) and the valve (8).

21. Apparatus according to claim 20 further comprising a gas pressure vessel (17) connected in front of the pneumatically actuated coupling (15) and/or the valve (8).

22. Apparatus according to claim 21 further comprising a gas connecting line between the gas pressure vessel (17) and the gas inlet pipe (14).

23. Apparatus according to claim 21 or 22 comprising a further gas pressure vessel loaded with opposite pressure to the gas pressure vessel (17) and connected before the pneumatically actuated coupling (15) and/or the valve (8).

24. Apparatus according to claim 16 wherein the pneumatically actuated coupling (15) and the valve (8)

are integrated together with the gas motor (2) and the gas pump (3) to one supercharger unit (1).

25. Apparatus according to claim 2 further comprising
    (a) an entraining disc (31) journalled coaxially to the disc (16) and axially displaceable and in active connected with a rotor (26) of the gas motor (2), the entraining disc having a thrust bearing (35) and a thrust bearing cover (36),
    (b) a movable cover (42), in active connection with the thrust bearing cover (36), of a chamber (21) loaded with pneumatic pressure and having a base region (39) and
    (c) at least one spring (33) in active connection with the entraining disc (31).

26. Apparatus according to claim 25, further comprising pins (49), engaging in the axial direction into bores (47) of the rotor (26) or of the entraining disc (31), on the entraining disc (31) or rotor (26) respectively.

27. Apparatus according to claim 25 or 26, further comprising a lever (45) acting between a mounting (43) on the thrust bearing cover (36) and a mounting (44) on the cover (42).

28. Apparatus according to claim 25 wherein the cover (42) is firmly connected to the thrust bearing cover (36).

29. Apparatus according to claim 25 wherein there is provided a pressure connection pipe (40) in a depression on the cover (42).

30. Apparatus according to claim 25 wherein the cover (42) closes the chamber (21) with the intermediate incorporation of a flat membrane (51).

31. Apparatus according to claim 25 wherein the spring (33) acts in opposition to the pneumatic pressure upon the entraining disc (31).

32. Apparatus according to claim 25 further comprising a cup spring (50) acting between the cover (42) and the base region (39).

33. Apparatus according to claim 32, wherein the cup spring (50) is a spring washer.

* * * * *